United States Patent [19]

Brown et al.

[11] Patent Number: 5,704,648
[45] Date of Patent: Jan. 6, 1998

[54] REMOVABLY REPLACEABLE, READHERABLE LABEL

[75] Inventors: Paul Albert Brown, Fort Dodge, Iowa; Craig Orrin Norvell, Olathe, Kans.; Leroy Alfred Jorgensen, Humbolt, Iowa

[73] Assignee: American Home Products Corporation, Madison, N.J.

[21] Appl. No.: 563,861

[22] Filed: Nov. 29, 1995

[51] Int. Cl.⁶ .................................................. B42D 15/00
[52] U.S. Cl. ........................................ 283/81; 283/103
[58] Field of Search .................................. 283/81, 100, 101, 283/103, 105, 56; 40/306, 310; 428/40–43, 40.1, 41.8, 41.9

[56] References Cited

U.S. PATENT DOCUMENTS

| | | |
|---|---|---|
| 1,145,367 | 7/1915 | Herter. |
| 1,273,105 | 7/1918 | Van Dyke et al.. |
| 2,844,893 | 7/1958 | Keller. |
| 3,494,059 | 2/1970 | Minasian .................. 40/306 X |
| 3,835,564 | 9/1974 | Gottschalk ................ 40/306 |
| 4,312,523 | 1/1982 | Haines. |
| 4,324,058 | 4/1982 | Sherwick et al.. |
| 4,584,219 | 4/1986 | Baartmans. |
| 4,700,976 | 10/1987 | Loose. |
| 4,727,667 | 3/1988 | Ingle. |
| 4,744,591 | 5/1988 | Instance. |
| 5,084,143 | 1/1992 | Smith. |
| 5,172,936 | 12/1992 | Sullivan et al.. |
| 5,178,419 | 1/1993 | Bolnick et al.. |
| 5,207,746 | 5/1993 | Jones. |
| 5,234,735 | 8/1993 | Baker et al.. |
| 5,263,743 | 11/1993 | Jones. |
| 5,264,265 | 11/1993 | Kaufmann. |
| 5,290,616 | 3/1994 | Cowan et al.. |
| 5,324,078 | 6/1994 | Bane. |
| 5,324,559 | 6/1994 | Brombacher. |
| 5,329,713 | 7/1994 | Landell .................... 40/310 |
| 5,340,158 | 8/1994 | Bartl. |
| 5,342,093 | 8/1994 | Weemink. |
| 5,389,415 | 2/1995 | Kaufmann. |
| 5,403,636 | 4/1995 | Crum. |

FOREIGN PATENT DOCUMENTS

| | | |
|---|---|---|
| 1304937 | 11/1991 | Canada. |
| 2111704 | 2/1994 | Canada. |
| 0 283 064 | 9/1988 | European Pat. Off.. |
| 2 244 694 | 11/1991 | European Pat. Off.. |
| 2 053 140 | 2/1981 | United Kingdom. |

*Primary Examiner*—Willmon Fridie, Jr.
*Attorney, Agent, or Firm*—Darby & Darby

[57] ABSTRACT

A container is made from an elongated sheet having a front surface, a rear surface, and a first end, a second end, a top edge and a bottom edge. The sheet includes a removable portion and a remainder portion. Both the removable portion and the remainder portion have identifying indicia printed thereon. The elongated sheet is preferably made of an uniaxially oriented material. The rear surface has an adhesive coating applied thereto. An adhesive reducing coating is applied to the adhesive coating adjacent to the first end of the elongated sheet.

51 Claims, 2 Drawing Sheets

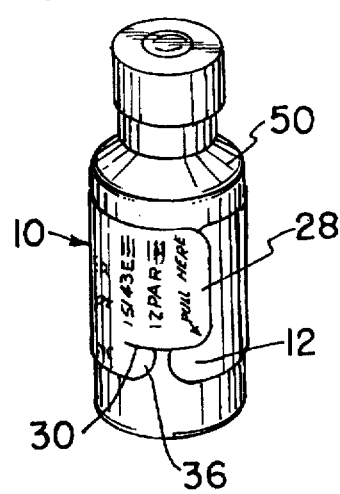
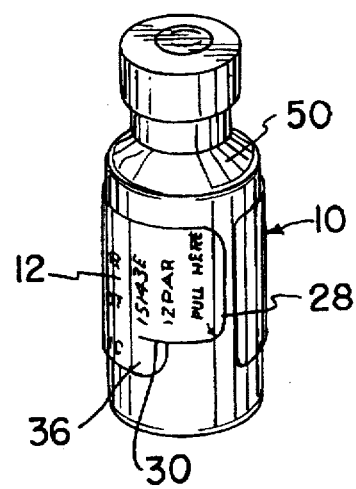
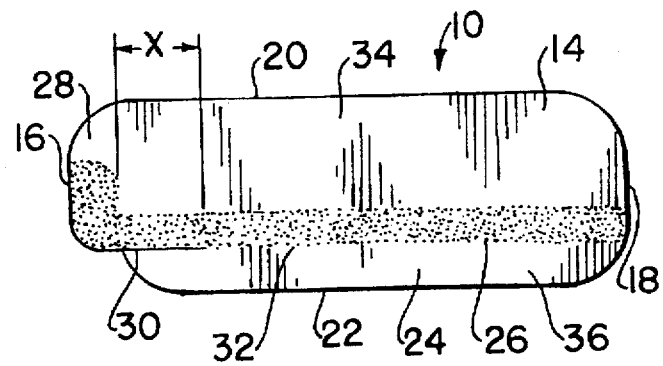
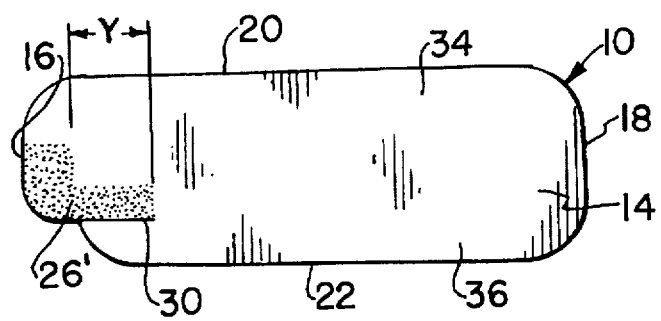
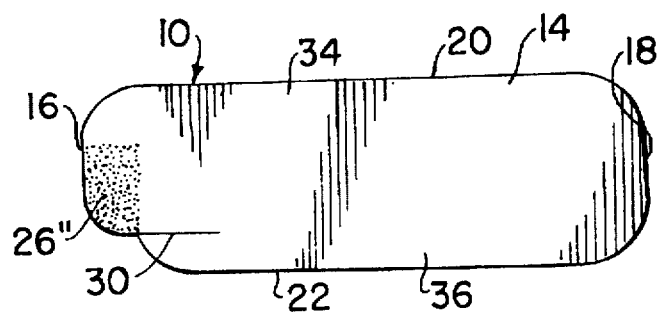

REMOVABLY REPLACEABLE, READHERABLE LABEL

BACKGROUND OF THE INVENTION

1. Field of the Invention

The present invention relates to adhesive labels. More specifically, the present invention relates a label that is adhesively connected to a container. A portion of the label can be removed from the container and readhered to a record keeping material, such as a logbook, medical book, etc.

2. Discussion of the Related Art

Currently, the majority of veterinarians maintain a record of a vaccine or other medical treatment, which has been administered to an animal, simply by writing the common name of the antigens or the medical treatment in the animal's medical chart. For example, a veterinarian using the DURAMINE® $DA_2PP+CvK/LCI$ would identify this vaccine in the animal's chart as DHLPPC along with the date of administration. This is typically the extent of the information that is recorded. In practices that have computerized their record keeping, the information recorded, is still limited to just this information and may sometimes include the manufacturer of the vaccine. In addition, those veterinarians that have computerized records still keep a hard copy of the animal's medical chart so that it is not necessary to print the entire patient history each time the animal visits the veterinarian.

Due to the increased regulatory pressures at the veterinary level, there is a need in the art to make it easier for a veterinarian to record all of the information necessary regarding the vaccine administered. Additionally, there is a need to retain on medical containers, having certain products therein, sufficient indicia to ensure further identification of the remaining contents so as to permit there further use, handling or appropriate disposal.

SUMMARY OF THE INVENTION

Accordingly, it is an object of the present invention, to provide a label which is securely adhesively connected to a container, such as a first medical container or a vaccine vial so as to permit a portion of the label to be easily removed therefrom and readhered to a second medical container, such as an infusion bug or a medical record keeping material, such as a medical logbook to completely identify the vaccine administered, while the portion of the label remaining on the container or vial continues to identify the former contents of the container or vial so that the container or vial can be disposed of properly. It is a further object to provide a label that overcomes the deficiencies in the art.

In a preferred embodiment, demonstrating further objects, features and advantages of the invention, the label includes an elongated sheet having a front surface, a rear surface, a first end, a second end, a top edge and a bottom edge. The sheet includes a removable portion and a remainder portion. Both the removable portion and the remainder portion have identifying indicia printed thereon. The rear surface has an adhesive coating applied thereto. An adhesive reducing coating is applied to the adhesive coating adjacent to the first end of the elongated sheet. In another preferred embodiment, the elongated sheet is made from an uniaxially oriented material.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIGS. 1A and 1B are a perspective view of a label according to the present invention adhesively connected to a vial;

FIGS. 2A, 2B and 2C are plan views of the rear surface of a label according to the present invention;

DETAILED DESCRIPTION OF THE PREFERRED EMBODIMENT

Figure 3:
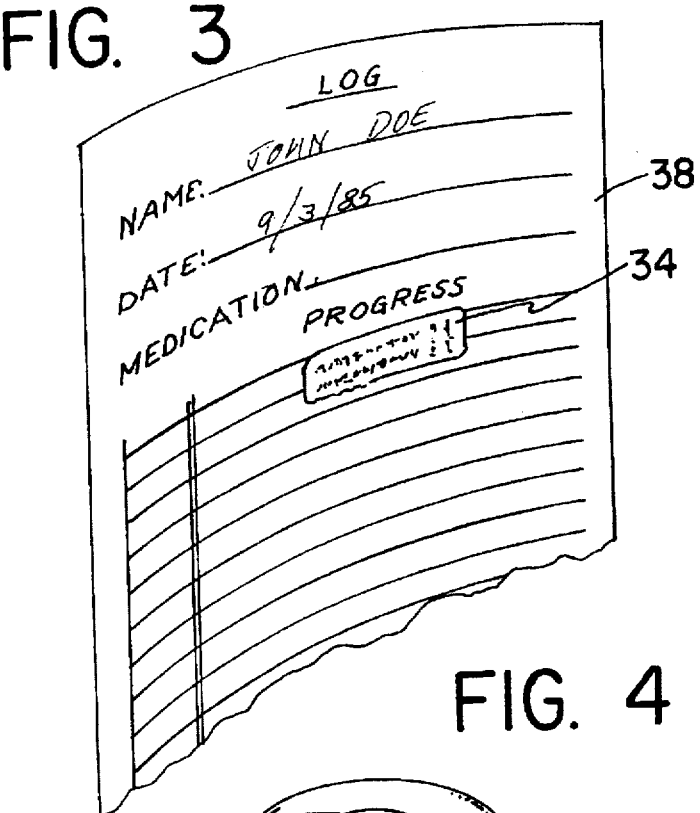
FIG. 3 is a perspective view of a veterinarian's logbook in which a portion of the label is adhesively connected thereto.

Referring now to FIGS. 1A, 1B, 2A, 2B and 2C, a label 10 according to the present invention is illustrated. The label 10 includes a removable portion 34 and a remainder portion 36. Both the removable portion 34 and the remainder portion 36 have indicia printed thereon to identify the contents of the container that the label is adhered to. The label 10 is comprised of an elongated sheet of material having a front surface 12 and a rear surface 14. The sheet includes a first end 16, a second end 18, a top edge 20 and a bottom edge 22.

An adhesive 24 is applied to the entire rear surface 14. The adhesive 24 is a pressure sensitive adhesive. In a preferred embodiment, the adhesive is an emulsion acrylic adhesive, such as the S 1000™ adhesive sold by Fasson, a films division of Avery Label of Painesville, Ohio. However, numerous other types of pressure sensitive adhesives may be used, including, for example, adhesives having a rubber base or an acrylic base.

The base material of the label 10 preferably has fibers embedded therein that are oriented in only one direction. In other words, the material is preferably an uniaxially oriented material. The fibers extend in a direction from the first end 16 to the second end 18, along an axis that is substantially parallel to the top edge 20 and the bottom edge 22. In a preferred embodiment, the label is made of an olefin film, such as the film PRIMAX™, which is sold by Fasson and which has such uniaxially oriented fibers.

An adhesive deadening, or adhesive reducing coating, 26 is applied to a strip of the adhesive coating on the rear surface of the label extending from the first end 16 to the second end 18, as illustrated in FIG. 2A. In another embodiment of the present invention, the adhesive reducing coating 26' is applied, a predetermined distance Y, from the first end 16 toward the second end 18 (see FIG. 2B). In a third embodiment, the adhesive reducing coating 26" is applied only on the first end in the area of tab 28 (see FIG. 2C). The adhesive reducing coating reduces, but does not eliminate, the adhesive effect of the adhesive coating in the areas in which it is applied to the rear surface 14. As illustrated in drawing FIGS. 2A-2C, the portion of the adhesive coating 24, upon which the adhesive reducing coating is applied, is spaced from the both the top edge 20 and the bottom edge 22. The adhesive reducing coating is applied along a tear line of the label, which divides the label into the removable portion and the remainder portion, to make the tearing away of the removable portion of the label easier for a user. The adhesive reducing coating is preferably a varnish such as RAD-KOTE™800, which is sold by RAD-CURE Corp. of Livingston, N.J. However, numerous other types of adhesive reducing coatings may be used so long as the coating reduces the adhesive effect of the previously applied adhesive coating 24, thereby permitting the label to be securely maintained on the vial with no loose or free edges so that the vial, with the label applied thereto, can be processed by conventional packaging and filling machinery without requiring any special modification thereof. The adhesive reducing coating also enables a user to begin the peeling of the removable portion 34 of the label away from the vial. In a preferred embodiment, the adhesive reducing coating is applied to the adhesive coating by a printing plate.

It will be appreciated by those skilled in the art that the adhesive coating need not be applied to the rear surface of the label in the area where the adhesive reducing coating is applied. In such an embodiment, a temporary adhesive would then be applied in the tab portion and the strip running from end to end may be free of adhesive so long as the removable portion and remainder portion above and below the strip have adhesive coating applied thereto. In such an embodiment, the adhesive coating would be applied to substantially the entire rear surface of the label.

As illustrated in FIGS. 2A–2C, the first end 16 includes a tab portion 28 extending away from the second end 18. Normally, approximately two-thirds of the rear surface of the tab portion 28 has the adhesive reducing coating 26 applied thereto to assist in permitting tab 28 to be lifted from the vial, but the adhesive coating may be applied to a smaller area as well. Alternatively, the adhesive reducing coating could be applied to the entire rear surface of tab portion 28.

The sheet has a score 30, which extends a predetermined distance X from the first end 16 towards the second end 18. In a preferred embodiment, distance X is approximately 15–20% of the distance between the first end and the second end, excluding the tab portion 28 of the label. Distance X is approximately equal to distance Y. However, it is to be understood that score 30 can be any length, including the length of the sheet from the first end to the second end. The score preferably extends a greater distance toward the second end of the sheet if the base material is not made from an uniaxially oriented material. It should also be understood that perforations could be used instead of a score. Score 30 is substantially coextensive with a lower boundary 32 on the rear surface 14 between the adhesive coating 24 and the adhesive reducing coating 26. The elongated sheet of material is, as pointed out above, preferably made from an uniaxially oriented material. The fibers of the sheet are preferably oriented in the same direction as the intended tear line for the label, which is substantially coextensive with boundary 32.

Referring now to FIGS. 1A, 1B and 3, the use of the label according to the present invention will now be described. Label 10 is first applied to a vial which preferably contains an animal vaccine for use by veterinarians. It is to be understood that the use of the label according to the present invention is not to be limited to veterinarian practice and can be used wherever it is desirable to remove an identifying label from a first member and reapply that label to a second member. The front surface 12 of the label 10 includes indicia printed thereon which includes identifying information regarding the vaccine such as, the vaccine's trade name, manufacturer, antigen content, serial number, expiration date, storage requirements, color coding, etc. The indica could also include information regarding a biological product or a radioactive medical product. After the vaccine has been administered to the animal, the veterinarian or his/her assistant can remove the removable portion 34 of the label 10 disposed above score 30 from the vial 50 by lifting tab 28 at its reduced adhesive portion and continuing to pull up on the tab. The label will begin to tear along score 30. Continued pulling upward on the tab 28, with a slight angle toward the top of the vial, causes the sheet to tear substantially in a straight line along boundary line 32. The sheet tears along a substantially straight line because the score initiates the direction of the tear line and/or the base material is made from an uniaxially oriented material, which is oriented along an axis that is parallel to the top edge 20, bottom edge 22 and score 30. Additionally, the location of the adhesive reducing coating 26 assists in permitting the sheet to tear along a substantially straight line along boundary line 32. Once the portion 34 of the label 10, which is disposed above score 30 and boundary 32, is removed from the vial, it can be reapplied to the veterinarian's logbook 38 for that animal, as illustrated in FIG. 3. The user would press down on label portion 34 to ensure adhesion of the label portion to the logbook. Portion 34 contains all the necessary identifying information on its front surface. The remaining portion 36 of the label, which is disposed below score 30 and boundary 32, will remain on the vial and also contains indicia which includes information to continue to identify the former contents of the vial. It is important, especially in the medical, pharmaceutical and biological fields, to maintain a portion of the label on the vial to continue to identify the former contents of the vial so that the vial can be disposed of properly.

Figure 4:
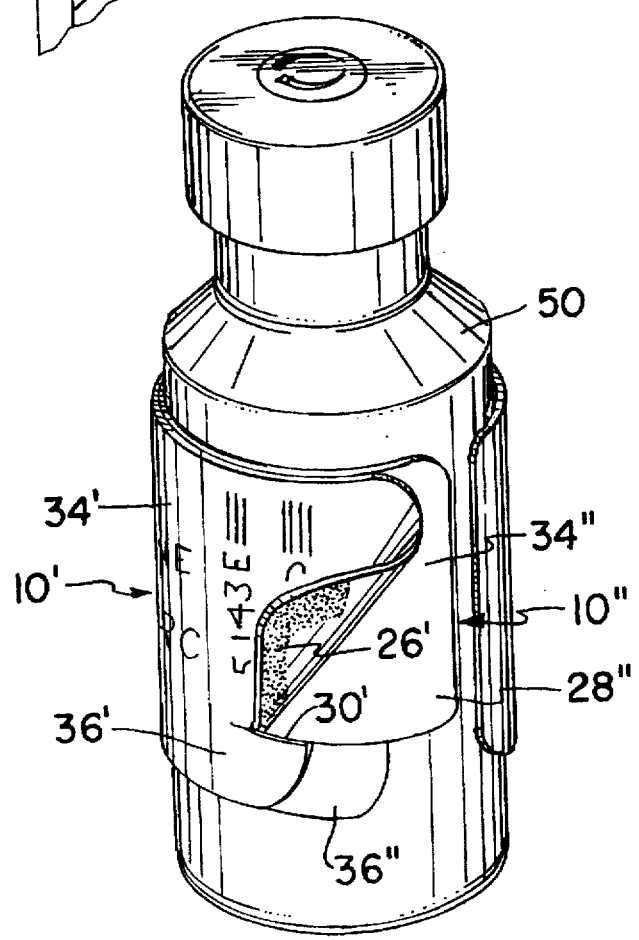
FIG. 4 is a perspective view of a pair of labels applied to a vial.

If vial 50 contains more than a single dosage of the vaccine, the outer surface of the vial should contain more than one label. FIG. 4 illustrates a vial that contains two dosages of vaccine. Accordingly, two labels 10', 10" are applied to the outer surface of the vial. It is to be understood that any number of labels can be applied to the vial, corresponding to at least the number of dosages that the vial contains. After the first dosage of the vaccine has been administered, portion 34' of the outermost label can be removed from the vial and can be reapplied to the veterinarian's logbook. While portion 34' is being removed, the user can apply pressure with his/her free hand to tab 28" of the second label 10" to ensure that portion 34" remains on the vial. Similarly, after the second dosage has been administered, portion 34" of the now outermost label 10" can be removed from the vial and reapplied to the logbook. Each removable portion 34', 34", etc. contains all the necessary identifying information on its from surface, while remainder portion 36', 36" also contains information sufficient to identify the contents of the vial. It will be appreciated by those skilled in the art that, when more than one label is applied to a vial, the front surface of the label, depending upon the material from which it is made, may have to be treated with a release coating to ensure the easy separation of one label from another label. Such release coatings are well known in the art.

In FIG. 4, labels 10', 10" are illustrated as being separated from one another and applied to the vial, one on top of the other. Alternatively, the labels 10', 10" can be attached to one another such that the second end 18' of the label 10' is connected to first end 16" of the second label 10" by a perforated connection (not shown). Thus, when the portion 34' is removed from the vial, the second end 18' of portion 34' can be separated from the first end 16" of the second label, by tearing along the perforated connection.

Having described the presently preferred exemplary embodiment of a label, it is believed that other variations, modifications, and changes will be suggested to those skilled in the art in view of the teachings set forth herein. For example, the label can be used with many various systems including human medical practices or wherever it is desirable to remove an identifying portion of the label from its container and reapply that portion to another surface. It is, therefore, to be understood that all such variations, modifications, and changes are believed to fall within the scope of the present invention as defined by the appended claims.

What is claimed is:

1. A removably replaceable label comprising:
   an elongated sheet having a front surface, a rear surface and a first end, a second end, a top edge and a bottom edge, said sheet comprising of a removable portion and a remainder portion, said removable portion and said remainder portion each having identifying indicia printed on a front surface thereof;
   said rear surface having an adhesive coating applied to substantially the entire surface, an adhesive reducing coating being applied to said adhesive coating adjacent to said first end of said elongated sheet.

2. The label according to claim 1, wherein said sheet has a score extending a predetermined distance from said one of said first end and said second end toward the other one of said one of said first end and said second end.

3. The label according to claim 1, wherein said first end includes a tab portion extending from the removable portion thereof, thereby forming a new first end.

4. The label according to claim 1, wherein said first end includes a tab portion extending from the removable portion thereof, thereby forming a new first end, wherein said adhesive reducing coating is applied on said new first end.

5. The label according to claim 1, wherein said adhesive reducing coating is applied to said adhesive coating in a location that is spaced from said top edge and said bosom edge.

6. The label according to claim 2, wherein said sheet is made from an uniaxially oriented material.

7. The label according to claim 2, wherein said sheet is oriented in a direction that said score extends.

8. The label according to claim 1, wherein said sheet is made from an olefin film.

9. The label according to claim 1, wherein said adhesive is an emulsion acrylic adhesive.

10. The label according to claim 2, wherein said adhesive reducing coating is a varnish.

11. The label according to claim 3, wherein said adhesive reducing coating is a varnish.

12. The label according to claim 1, wherein said indicia includes information selected from a biological product and a radioactive medical product.

13. A label comprising:
    an elongated sheet having a front surface, a rear surface and a first end, a second end, a top edge and a bottom edge, said sheet comprising of a removable portion and a remainder portion, said removable portion and said remainder portion each having identifying indicia printed on a front surface thereof;
    said rear surface having an adhesive coating applied to substantially the entire surface, an adhesive reducing coating being applied to said adhesive coating adjacent to said first end and to a strip of said adhesive coating extending for a predetermined distance toward said second end of said elongated sheet.

14. The label according to claim 13, wherein said strip is spaced from said top edge and said bottom edge.

15. The label according to claim 13, wherein said first end includes a tab portion extending from the removable portion thereof, thereby forming a new first end.

16. The label according to claim 13, wherein said first end includes a tab portion extending from the removable portion thereof, thereby forming a new first end, wherein said adhesive reducing coating is applied on said new first end.

17. The label according to claim 13, wherein said sheet has a score extending a predetermined distance from said one of said first end and said second end toward the other one of said one of said first end and said second end.

18. The label according to claim 17, wherein said score is substantially coextensive with a boundary on said rear surface between said adhesive coating and said adhesive reducing coating.

19. The label according to claim 13, wherein said sheet is made from an uniaxially oriented material.

20. The label according to claim 13, wherein said sheet is made from an olefin film.

21. The label according to claim 13, wherein said adhesive is an emulsion acrylic adhesive.

22. The label according to claim 17, wherein the predetermined distance that said adhesive reducing coating extends is approximately equal to the predetermined distance that said score extends.

23. The label according to claim 13, wherein said sheet is made from an uniaxially oriented material.

24. The label according to claim 17, wherein said adhesive reducing coating is a varnish.

25. The label according to claim 13, wherein said indicia includes information selected from a biological product and a radioactive medical product.

26. A label comprising:
    an elongated sheet having a from surface, a rear surface and a first end, a second end, a top edge and a bottom edge, said sheet being made from an uniaxially oriented material, said sheet comprising of a removable portion and a remainder portion, said removable portion and said remainder portion each having identifying indicia printed on a front surface thereof, said sheet has a score extending a predetermined distance from one of said first end and said second end toward the other one of said one of said first end and said second end; and
    said rear surface having an adhesive coating applied to substantially the entire surface.

27. The label according to claim 26, further comprising an adhesive reducing coating being applied to said adhesive coating adjacent to said first end of said elongated sheet.

28. The label according to claim 27, wherein said adhesive reducing coating is applied adjacent to said first end and along said score.

29. The label according to claim 26, wherein said adhesive reducing coating is applied adjacent to said first end and along said score.

30. The label according to claim 28, wherein said strip of said adhesive coating extends from said first end to said second end along said score.

31. The label according to claim 28, wherein said strip is spaced from said top edge and said bottom edge.

32. The label according to claim 26, wherein said first end includes a tab portion extending from the removable portion thereof, thereby forming a new first end.

33. The label according to claim 26, wherein said first end includes a tab portion extending from the removable portion thereof, thereby forming a new first end, wherein said adhesive reducing coating is applied on said new first end.

34. The label according to claim 26, wherein said score is substantially coextensive with a boundary on said rear surface between said removable portion and said remainder portion.

35. The label according to claim 26, wherein said adhesive reducing coating is a varnish.

36. The label according to claim 35, wherein said indicia includes information selected from a biological product and a radioactive medical product.

37. The label according to claim 26, wherein said sheet is oriented in a direction that said score extends.

38. A medical container comprising:
   an outer surface; and
   a removable replaceable readherable label comprising:
      an elongated sheet being adhesively connected to said outer surface, said elongated sheet having a front surface, a rear surface and a first end, a second end, a top edge and a bottom edge, said sheet comprising of a removable portion and a remainder portion, said removable portion and said remainder portion each having identifying indicia printed on a front surface thereof;
      said rear surface having an adhesive coating applied to substantially the entire surface, an adhesive reducing coating being applied to said adhesive coating adjacent to said first end of said elongated sheet.

39. The container according to claim 38, wherein said indicia includes information selected from a biological product and a radioactive medical product.

40. The container according to claim 38, wherein said adhesive reducing coating is applied adjacent to said first end and to a strip of said adhesive coating extending for a predetermined distance toward said second end of said elongated sheet.

41. The container according to claim 40, wherein said strip of said adhesive coating extends from said first end to said second end.

42. The container according to claim 41, wherein said strip is spaced from said top edge and said bottom edge.

43. The container according to claim 38, wherein said first end includes a tab portion extending therefrom, thereby forming a new first end.

44. The container according to claim 38, wherein said first end includes a tab portion extending from the removable portion thereof, thereby forming a new first end, wherein said adhesive reducing coating is applied on said new first end.

45. The container according to claim 38, wherein said sheet has a score extending a predetermined distance from said one of said first end and said second end toward the other one of said one of said first end and said second end.

46. The container according to claim 45, wherein said score is substantially coextensive with a boundary on said rear surface between said adhesive coating and said adhesive reducing coating.

47. The container according to claim 46, wherein said sheet is made from an uniaxially oriented material.

48. The container according to claim 38, wherein said sheet has a score extending a predetermined distance from one of said first end and said second end toward the other one of said one of said first end and said second end.

49. The container according to claim 48, wherein said sheet is oriented in a direction that said score extends.

50. The container according to claim 38, wherein said container further comprises a plurality of removable replaceable readherable labels adhesively connected to said outer surface.

51. The container according to claim 38, wherein said sheet further comprises a plurality of removable portions.

* * * * *